(12) United States Patent
Li et al.

(10) Patent No.: US 12,449,319 B2
(45) Date of Patent: Oct. 21, 2025

(54) BEAM PRESSURE SENSOR, PRESSURE SENSING DEVICE AND ELECTRONIC APPARATUS HAVING A BENDING BEAM WITH TWO FIXED ENDS

(71) Applicant: SHENZHEN NEW DEGREE TECHNOLOGY CO., LTD., Guangdong (CN)

(72) Inventors: Hao Li, Guangdong (CN); Ping Zhang, Guangdong (CN); Yabo Guo, Guangdong (CN)

(73) Assignee: SHENZHEN NEW DEGREE TECHNOLOGY CO., LTD., Shenzhen (CN)

( * ) Notice: Subject to any disclaimer, the term of this patent is extended or adjusted under 35 U.S.C. 154(b) by 309 days.

(21) Appl. No.: 18/024,456

(22) PCT Filed: Sep. 4, 2020

(86) PCT No.: PCT/CN2020/113538
§ 371 (c)(1),
(2) Date: Mar. 2, 2023

(87) PCT Pub. No.: WO2022/047739
PCT Pub. Date: Mar. 10, 2022

(65) Prior Publication Data
US 2023/0332964 A1    Oct. 19, 2023

(51) Int. Cl.
*G01L 1/18*    (2006.01)
*G01L 1/16*    (2006.01)

(52) U.S. Cl.
CPC . *G01L 1/18* (2013.01); *G01L 1/16* (2013.01)

(58) Field of Classification Search
CPC ... G01L 1/2225; G01L 1/2218; G01L 1/2281; G01L 1/2206; G01N 2203/0019; G01N 2203/0016

(Continued)

(56) References Cited

U.S. PATENT DOCUMENTS 4,420,985 A * 12/1983 Raskin ................. G01L 1/2225
                                                 73/862.633
4,542,800 A *  9/1985 Knothe ................ G01G 3/1412
                                                 73/862.633
(Continued)

FOREIGN PATENT DOCUMENTS

CN            1873386       12/2006
CN          201335730       10/2009
(Continued)

OTHER PUBLICATIONS

International Search Report for PCT/CN2020/113538 dated Mar. 30, 2021, 8 pages.

(Continued)

*Primary Examiner* — Tran M. Tran
(74) *Attorney, Agent, or Firm* — Nixon & Vanderhye, P.C.

(57) ABSTRACT

A beam pressure sensor, a pressure sensing device, an electronic apparatus are disclosed. The beam pressure sensor includes: a bending beam, provided with two ends that are fixed, outside wall surfaces of the bending beam are provided with a stressed surface and a strain surface arranged to be opposite to each other; and one or more strain gauges, each strain gauge being electrically connected to a circuit configured for detecting strain; and at least one of the stressed surface and the strain surface is provided with at least one of the strain gauges. The detection sensitivity of the beam pressure sensor is improved, a small displacement is only needed for the detected force.

13 Claims, 13 Drawing Sheets

(58) Field of Classification Search
USPC .................................................. 73/862.623
See application file for complete search history.

(56) References Cited

U.S. PATENT DOCUMENTS

| | | | | |
|---|---|---|---|---|
| 4,677,862 A * | 7/1987 | Raskin | ................. | G01L 1/2225 |
| | | | | 73/862.633 |
| 5,129,266 A * | 7/1992 | Brandt, Jr. | ............ | G01L 1/2281 |
| | | | | 73/862.623 |
| 5,230,252 A * | 7/1993 | O'Brien | ................ | G01L 1/2243 |
| | | | | 177/211 |
| 5,512,713 A * | 4/1996 | Naito | .................. | G01G 3/1412 |
| | | | | 177/229 |
| 5,623,128 A * | 4/1997 | Grimm | ................... | G01G 3/18 |
| | | | | 177/229 |
| 5,929,391 A * | 7/1999 | Petrucelli | ................. | G01G 3/13 |
| | | | | 177/229 |
| 5,983,729 A * | 11/1999 | Taylor | .................... | G01L 5/0061 |
| | | | | 73/849 |
| 8,161,829 B2 * | 4/2012 | Zandman | .............. | G01L 1/2281 |
| | | | | 73/862.622 |
| 8,181,541 B2 * | 5/2012 | Berme | ................. | G01L 5/1627 |
| | | | | 73/862.639 |
| 9,234,809 B2 * | 1/2016 | Smith | .................. | G01G 19/047 |
| 9,310,265 B2 * | 4/2016 | Shimoyama | ............ | G01L 5/228 |
| 10,470,328 B2 * | 11/2019 | Steinich | ............... | G08B 21/182 |
| 10,948,367 B2 * | 3/2021 | Steyn | ..................... | H05K 1/028 |
| 10,969,267 B1 * | 4/2021 | Franklin | ................ | G01G 19/18 |
| 11,555,750 B2 * | 1/2023 | Westergaard | ......... | G01L 1/2225 |
| 11,630,018 B2 * | 4/2023 | Edmiston | ................ | G01L 1/225 |
| | | | | 73/1.15 |
| 11,808,620 B2 * | 11/2023 | Takeichi | ................ | G01G 21/00 |
| 11,874,192 B2 * | 1/2024 | Rahav | ................... | G01L 1/2218 |
| 2005/0160837 A1 * | 7/2005 | Tellenbach | ........... | G01G 3/1402 |
| | | | | 73/862.625 |
| 2014/0224037 A1 | 8/2014 | Shimoyama et al. | | |
| 2023/0146214 A1 * | 5/2023 | Huang | .................. | G01L 1/2262 |
| | | | | 73/862.626 |

FOREIGN PATENT DOCUMENTS

| | | |
|---|---|---|
| CN | 202614433 | 12/2012 |
| CN | 103134625 | 6/2013 |
| CN | 103759632 | 4/2014 |
| CN | 204652340 | 9/2015 |
| CN | 206330693 | 7/2017 |
| CN | 107314852 | 11/2017 |

OTHER PUBLICATIONS

Written Opinion of the ISA for PCT/CN2020/113538 dated Mar. 30, 2021, 3 pages.

* cited by examiner

111

BEAM PRESSURE SENSOR, PRESSURE SENSING DEVICE AND ELECTRONIC APPARATUS HAVING A BENDING BEAM WITH TWO FIXED ENDS

CROSS REFERENCE TO RELATED APPLICATION

The present application is a National Stage Application of International Patent Application No. PCT/CN2020/113538, filed on Sep. 4, 2020. The entire contents of the aforementioned application, including any intervening amendments thereto, are incorporated herein by reference for all purposes.

TECHNICAL FIELD

The present application relates to the technical field of pressure detection, and more particularly to a beam pressure, a pressure sensing device, an electronic apparatus.

BACKGROUND

The beam pressure sensor is a kind of sensing device, which uses the bending beam and the strain gauges to convert the detected force into the changes of corresponding electrical signal. The bending beam is a cantilever structure. In the process of practical application, on the basis that the bending beam is a cantilever structure with one end fixed and the displacement of the detected force is small, due to the limitation of the mechanical structure principle of the cantilever beam with one end fixed, the strain generated on the bending beam is relatively small, which causes the detection sensitivity of the beam pressure sensor to be decreased.

SUMMARY

One of the objects of embodiments of the present application is to provide a beam pressure sensor and an apparatus, in order to solve problem that when the displacement of the detected force is small, the strain generated on the bending beam is relatively small, which causes the detection sensitivity of the beam pressure sensor to be decreased.

In order to solve above technical problem, the technical solution adopted by embodiments of the present application are as following:

In a first aspect, a beam pressure sensor is provided, which includes:
 a bending beam, provided with two ends that are fixed, wherein outside wall surfaces of the bending beam are provided with a stressed surface and a strain surface arranged to be opposite to each other; and
 one or more strain gauges, being electrically connected to a circuit configured for detecting strain;
 at least one of the stressed surface and the strain surface is provided with at least one of the strain gauges.

In an embodiment of the present application, the bending beam is in a sheet shape, one side of which is the stressed surface, and the other side is the strain surface.

In an embodiment of the present application, a length of the bending beam is ranged from 1 mm to 50 mm, a thickness of the bending beam is ranged from 0.1 mm to 10 mm, and a width-thickness ratio of the bending beam is ranged from 0.1 to 500.

In an embodiment of the present application, the Young's modulus of the bending beam is ranged from 0.01 GPa to 1000 GPa.

In an embodiment of the present application, the beam pressure sensor further includes a strain-side circuit board attached to the strain surface, and the strain-side circuit board is mounted with at least one of the strain gauges.

In an embodiment of the present application, the stressed-side circuit board is bonded to the stressed surface through a bonding structural member.

In an embodiment of the present application, the beam pressure sensor further includes a stressed-side circuit board attached to the stressed surface, and the stressed-side circuit board is mounted with at least one of the strain gauges.

In an embodiment of the present application, the stressed-side circuit board is bonded to the strain surface through a bonding structural member.

In an embodiment of the present application, both the stressed surface and the strain surface are respectively provided with at least one of the strain gauges.

In an embodiment of the present application, the strain gauge is a piezoresistor or a piezoelectric ceramic.

In an embodiment of the present application, the beam pressure sensor further includes a force-transmitting structural member arranged to be opposite to the stressed surface and abutted against the stressed surface.

In a second aspect, a pressure sensing device is provided, which includes:
 a base;
 a stressed member;
 at least two beam pressure sensors, mounted on the base, each of the beam pressure sensors includes: a bending beam, a strain gauge, and a force-transmitting structural member; a plurality of the strain gauges are provided, two ends of the bending beam are fixed, and outside wall surfaces of the bending beam are provided with a stressed surface and a strain surface arranged to be opposite to each other; at least one of the stressed surface and the strain surface is provided with at least one of the strain gauges; and the strain gauges form at least one circuit for detecting strain, and the force-transmitting structural member is arranged to be opposite to and abuts against the stressed surface;
 each force transmission structural member is abutted against the stressed member, and each of the beam pressure sensors is located between the base and the stressed member.

In an embodiment of the present application, the pressure sensing device further includes a common connector, and both ends of each bending beam are fixed to the common connector.

In an embodiment of the present application, each bending beam and the common connector are integratedly formed.

In an embodiment of the present application, each bending beam is connected to the common connector through at least one connecting member.

In a third aspect, an electronic apparatus is provided, which includes at least one beam pressure sensor, and the beam pressure sensor includes:
 a bending beam, provided with two ends that are fixed, and outside wall surfaces of the bending beam are provided with a stressed surface and a strain surface arranged to be opposite to each other; and
 one or more strain gauges, being electrically connected to a circuit configured for detecting strain;

at least one of the stressed surface and the strain surface is provided with at least one of the strain gauges.

In the present application, the two ends of the bending beam are fixed, compared with the bending beam which is only fixed at one end (i.e. cantilever structure), a large strain difference can be generated on the bending beam in the case of a small displacement of the detected force, therefore, the detection sensitivity of the beam pressure sensor is improved.

BRIEF DESCRIPTION OF THE DRAWINGS

In order to more clearly explain the technical solution in the embodiments of the present application, the following will briefly introduce the drawings needed in the embodiments or the exemplary technical description. It is obvious that the drawings in the following description are only some embodiments of the present application. For those skilled in the art, other drawings can also be obtained from these drawings without creative work.

Figure 1:
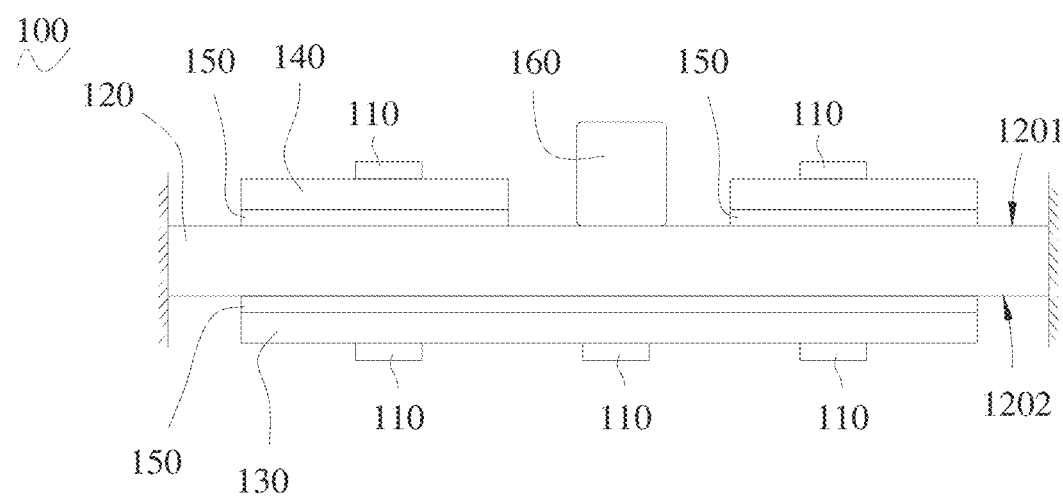
FIG. 1 is a structural view of a beam pressure sensor provided by an embodiment of the present application.

In the drawings, the reference signs are listed:
100—beam pressure sensor; 110—strain gauge; 111—base material; 112—pressure sensitive adhesive; 113—conductive layer; 114—insulation layer; 120—bending beam; 1201—stressed surface; 1202—strain surface; 130—strain-side circuit board; 140—stressed-side circuit board; 150—bonding structural member; 160—force-transmitting structural member;
200—stressed member; 300—common connector; 400—base.

DETAILED DESCRIPTION OF EMBODIMENTS

In order to make the purpose, technical scheme and advantages of the present application more clear, the present application will be further described in detail with the attached drawings and embodiments. It should be understood that the specific embodiments described herein are only used to explain the present application and not to limit the present application.

It should be noted that when a component is called "fixed to" or "arranged to" another component, it can be directly or indirectly on another component. When a component is called "connected to" another component, it can be directly or indirectly connected to the other component. "A plurality of" means two or more, unless otherwise specified.

In order to illustrate the technical solution provided in the present application, the following is a detailed description in combination with specific drawings and embodiments.

As shown in FIG. 1, some embodiments of the present application provide a beam pressure sensor 100, which includes a strain gauge 110 and a bending beam 120.

In an embodiment, the two ends of the bending beam 120 are fixed. The two ends of the bending beam 120 can be fixed by various manners, including but not limited to: the two ends are fixed by screws, the two ends are fixed by hard glue, and the two ends are fixed by welding. The outside wall surfaces of the bending beam 120 are provided with a stressed surface 1201 and a strain surface 1202 that are arranged to be opposite to each other, the stressed surface 1201 is used to suffer from a force to be detected, which can be directly suffered from the force to be detected, or suffered from the force to be detected through an external structural member (such as the force-transmitting structural member 160 of the present application).

A plurality of strain gauges 110 is provided, and each strain gauge 110 is electrically connected to a circuit for detecting strain.

At least one of the strain gauges 110 is arranged on at least one of the stressed surface 1201 and strain surface 1202.

When in use, that is, when the stressed surface 1201 is suffered from the force to be detected, the bending beam 120 deforms, and the bending beam 120 transmits the detected force to each strain gauge 110, so that the strain gauges 110 generate stress deformations, and then outputs the electrical signal corresponding to the strength of the stress deformations based on the piezoresistive effect.

In the present application, the two ends of the bending beam 120 are fixed. Compared with the bending beam 120 which is only fixed at one end (i.e. cantilever structure), the difference in mechanical principle between the two mentioned above determines that the detected force only needs to generate a small displacement, which can make the bending beam 120 generate a large strain difference. Therefore, in the case of a small displacement is generated by the detected force, the bending beam 120 can generate a large strain difference, such that the strain difference of different strain gauges 110 transmitted to the bending beam 120 is larger, which improves the detection sensitivity of the beam pressure sensor 100, that is, the beam pressure sensor 100 improves the detection sensitivity, and the detected force only needs to generate a small displacement.

It should be noted here that strain gauges 110 can be arranged in different positions and angles relative to each other.

For the mechanical working principle of the beam pressure sensor, which can be referred to FIGS. 2 to 5. When in use, that is, when the stressed surface 1201 is suffered from the force to be detected, the bending beam 120 deforms, and the directions and magnitude of the principal strain of the bending beam 120 are different at different positions. The bending beam 120 transmits the detected force to the strain gauges 110, so that the strain gauges 110 generate stress deformations. Further, a bridge circuit as shown in FIG. 6 is formed, and then the electric signal of corresponding strength of the stress deformations is output based on the piezoresistive effect.

Figure 6:
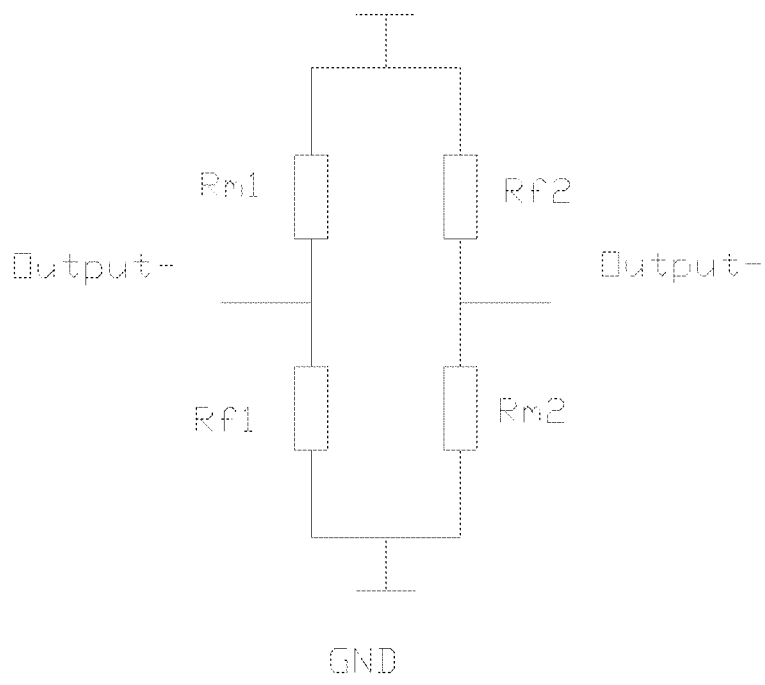
FIG. 6 is a bridge circuit composed of four strain gauges of a beam pressure sensor provided by an embodiment of the present application.

The method of measuring the variation of strain gauge 110 shown in FIG. 6 is only a common measuring method, and which can also be the following several measuring methods.

Figure 7:
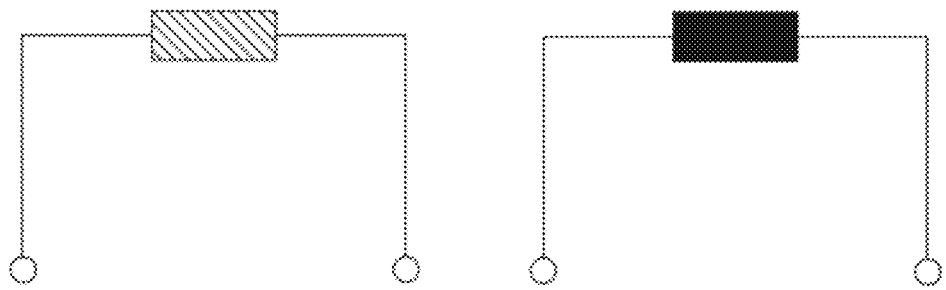
FIG. 7 is a first measuring circuit of other measuring circuits of a beam pressure sensor provided by an embodiment of the present application.
Figure 8:
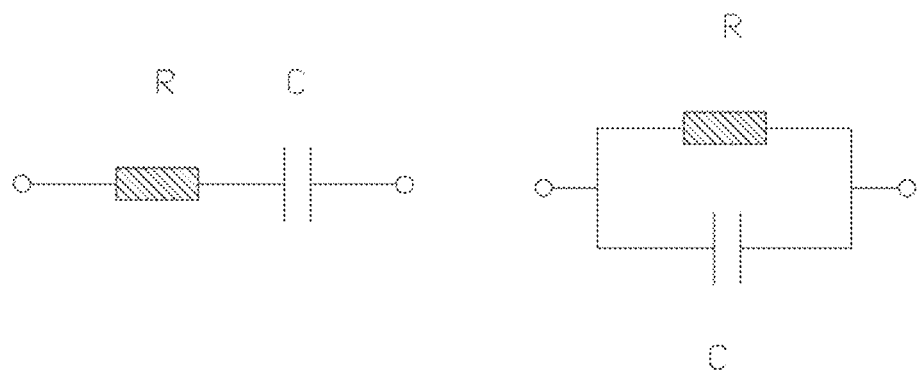
FIG. 8 is two RC circuits that can be selectively implemented in FIG. 7.

A first measuring method: as shown in FIG. 7, the measuring method is selected from a group of measuring resistance through ohmmeter, measuring resistance through volt-ampere method, measuring resistance through RC circuit, measuring resistance through RC oscillation circuit, and measuring resistance through RLC parallel resonance circuit, and so on, as required; measuring resistance through ohmmeter and measuring resistance through volt-ampere method are direct resistance measuring methods, and the corresponding resistance measuring circuit belongs to conventional technology. The RC circuit can be RC series circuit as shown in FIG. 8, or RC parallel circuit. The time constant τ of RC circuit can be measured by charging and discharging the RC circuit. The time constant τ of the RC circuit is:

τ=RC

According to the above formula, if the capacitance C of the capacitor is known, the resistance R can be inversely calculated according to the measured time constant τ.

Figure 9:
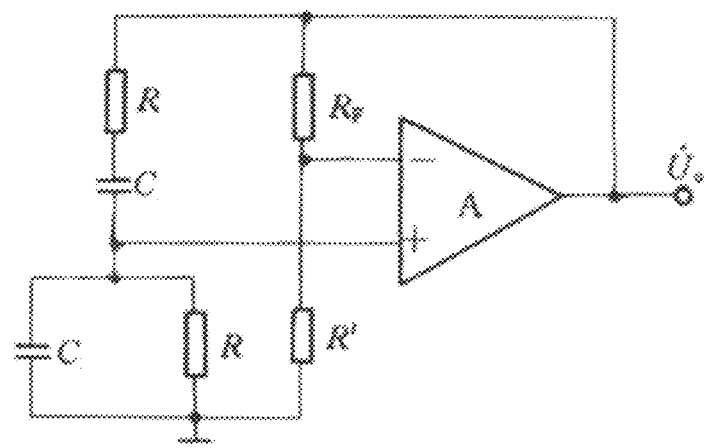
FIG. 9 is an oscillation circuit of the Venturi bridge.

As shown in FIG. 9, the RC oscillation circuit combines the RC series-parallel frequency selection network with the amplifier. The amplifier can use the integrated operational amplifier. The RC series-parallel frequency selection network is connected between the output end and the in-phase input end of the operational amplifier to form a positive feedback, while RF and R are connected between the output end and the inverse input end of the operational amplifier to form a negative feedback. The positive feedback circuit and the negative feedback circuit form a Venturi bridge oscillation circuit, and the input and output ends of the operational amplifier are respectively connected on the two diagonals of the bridge. The output frequency of the Venturi bridge oscillation circuit is:

$$f_0 = \frac{1}{2\pi RC}$$

The frequency $f_0$ is very sensitive to the change of resistance R. According to the above formula, if the capacitance C of the capacitor is known, the resistance value R can be inversely calculated according to the measured frequency $f_0$.

Figure 10:
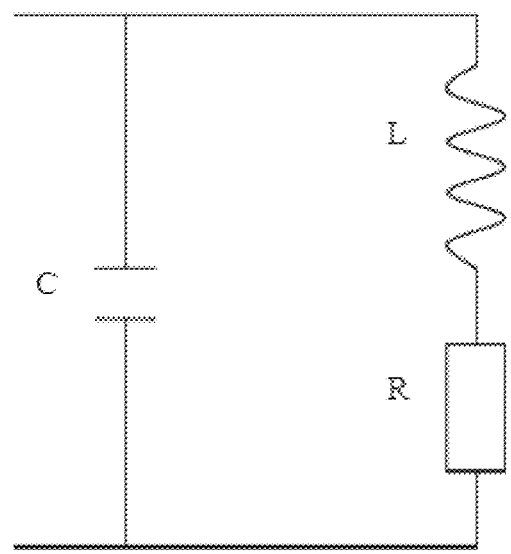
FIG. 10 is a RLC parallel resonant circuit.

As shown in FIG. 10, the RLC parallel resonant circuit is a circuit that parallels the RL series circuit and capacitor C. The angular frequency of the RLC parallel resonant circuit is:

$$\omega = \sqrt{\frac{1}{LC} - \left(\frac{R}{L}\right)^2}$$

According to the above formula, if the inductance L of the inductor and the capacitance C of the capacitor are known, the resistance value R can be inversely calculated according to the measured angular frequency ω.

Figure 11:
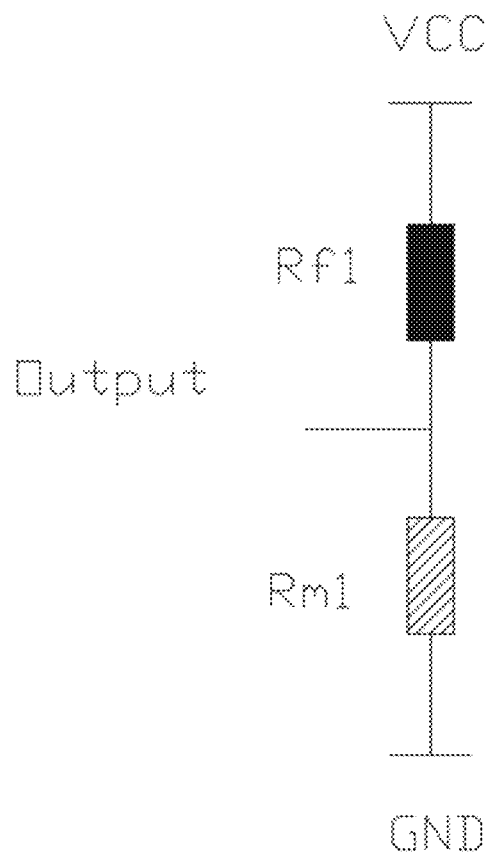
FIG. 11 is a second measuring circuit of other measuring circuits of a beam pressure sensor provided by an embodiment of the present application.

A second measuring method:

The second method of measuring: as shown in FIG. 11, the resistance Rm and Rf in the circuit form a half-bridge circuit. The constant voltage source is used, and the input voltage VCC is applied at both ends of the circuit to measure the potential at OUTPUT, or to measure the output voltage Uo between OUTPUT and the ground. The input and output voltage formula is:

Uo=Vcc*Rm1/(Rm1+Rf1)

Figure 12:
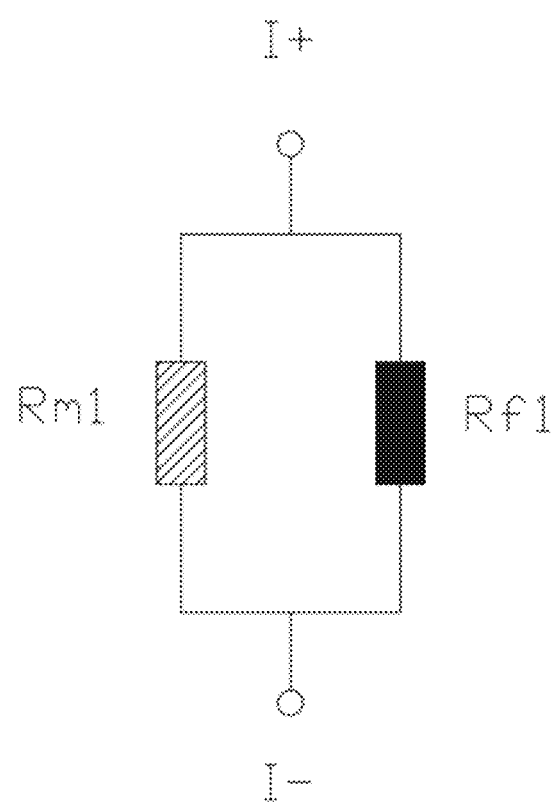
FIG. 12 is a third measuring circuit of other measuring circuits of a beam pressure sensor provided by an embodiment of the present application.

A third measuring method: as shown in FIG. 12, the resistance Rm1 and Rf1 in the circuit connected in parallel form a shunt circuit. The constant current source is used, and the input current I is applied at I+ and I− ends to measure the output current I1 on Rm1 branch, the input and output current formula is:

I1=(Rf1/(Rm1+Rf1))*I

Figure 2:
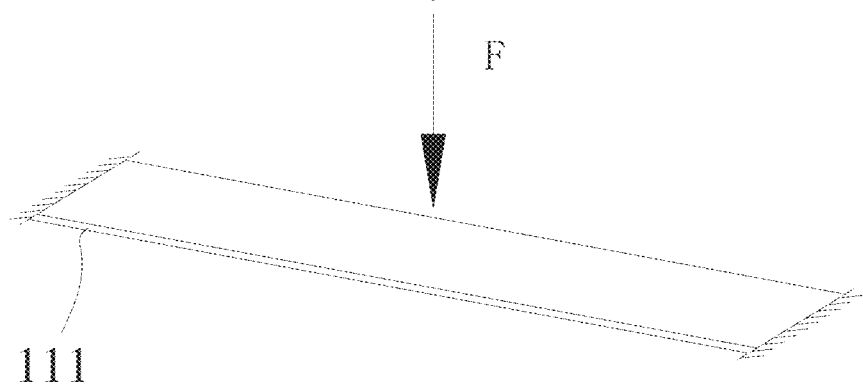
FIG. 2 is a perspective view of a stressed state of a bending beam of a beam pressure sensor provided by an embodiment of the present application.
Figure 3:
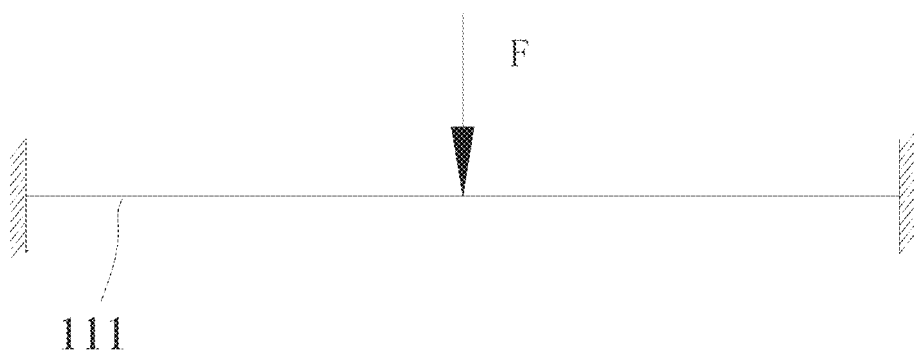
FIG. 3 is a side view of FIG. 2.
Figure 4:
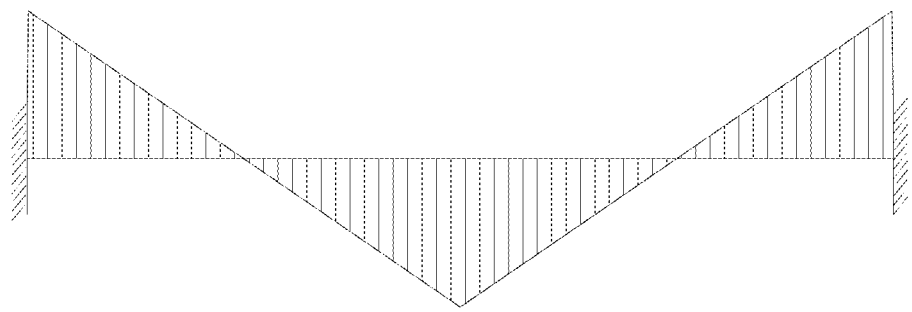
FIG. 4 is a surface strain distribution diagram of the bending beam in FIG. 2.
Figure 21:
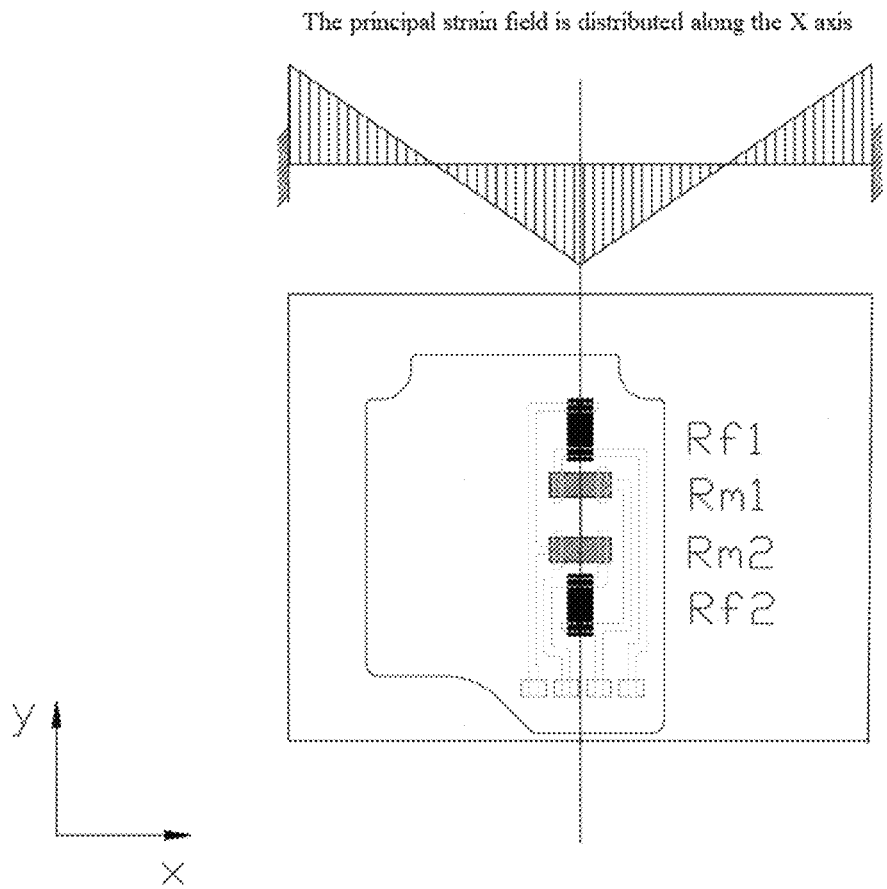
FIG. 21 is a relationship between a principal strain and a temperature field of a bending beam, where a temperature gradient direction and a principal strain gradient direction of the bending beam are parallel.
Figure 22:
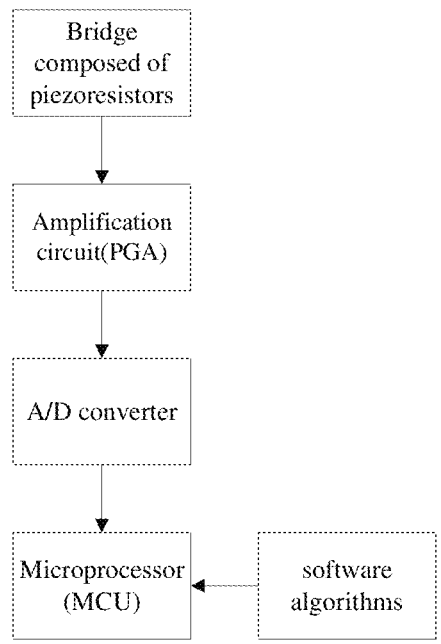
FIG. 22 is a flowchart of pressure measuring of a pressure sensing device provided by an embodiment of the present application.
Figure 23:
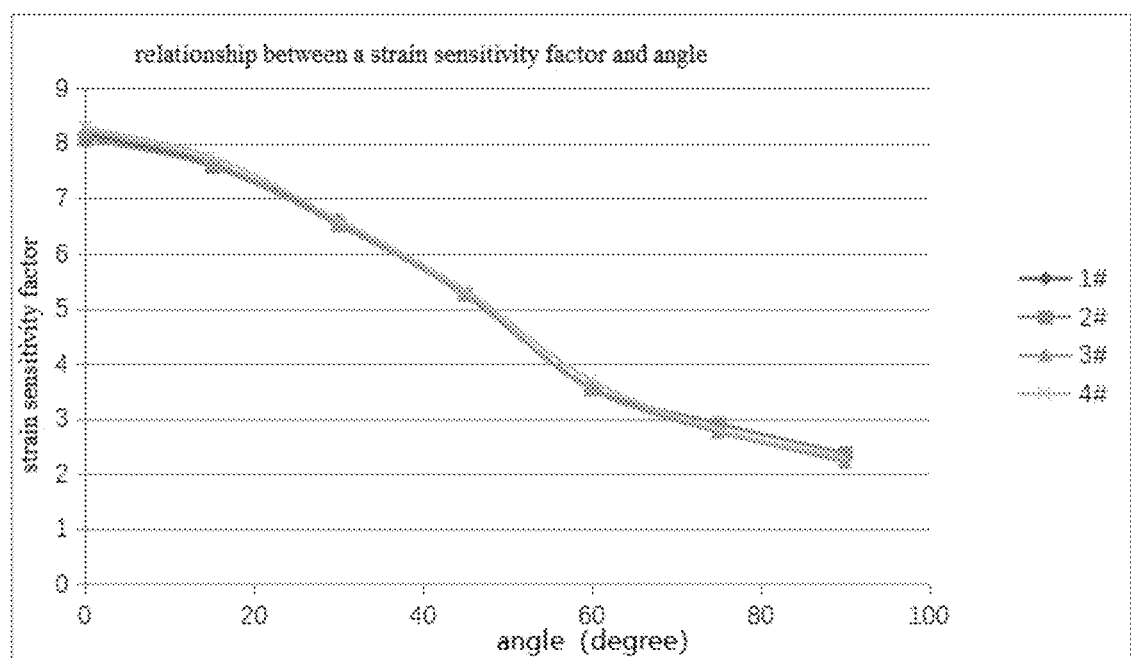
FIG. 23 is a relationship between a strain sensitivity factor and angle of a piezoresistor in a pressure sensing device of the present application.

It should be noted here that in the specific embodiment, the strain gauges 110 are arranged at different positions on the bending beam 120, and the pressure can be effectively measured by measuring the strain difference at different positions. In the actual application scenario, the temperatures of strain gauges 110 at different positions are different. The positions of strain gauges 110 can be designed according to the distribution of temperature field to offset the impact of temperature. As shown in FIG. 7, several implementation structures can be selected according to demand, thus the accurate measuring of force can be improved by beam pressure sensor 100. FIG. 21 and FIG. 22 illustrate temperature compensation. The temperature gradient direction of bending beam 120 in FIG. 21 is perpendicular to the principal strain gradient direction, and four strain gauges 110 form a Wheatstone bridge. As shown in FIGS. 2 to 4, the Rm1 and Rf1 in the circuit are placed on the parallel line of the x-axis, that is, the isothermal line. The Rm2 and Rf2 in the circuit are placed on the parallel line of the x-axis, that is, the isothermal line, which can offset the impact of temperature on the output signal of the bridge. At the same time, the strains of the bending beam 120 corresponding to the positions of Rm1 and Rf1 are different. Therefore, when the bending beam is deformed, the bridge outputs the signals to measure the bending beam deformation, and that of the Rm2 and Rf2 are the same. In addition, the temperature gradient direction and the principal strain gradient direction of the bending beam 120 in FIG. 22 are parallel, and the straight line where the four strain gauges 110 are located is parallel to the y-axis, and the four strain gauges 110 form a Wheatstone bridge. Due that the strain sensitivity factor of the piezoresistor in the pressure sensing device is connected with the angle, as shown in FIG. 23. Therefore, although the strains of the bending beam 120 are the same at the position of the four piezoresistors, the placement angles are different, and the change of the piezoresistors are different. Therefore, when the bending beam 120 is deformed, the bridge outputs a signal to measure the deformation of the bending beam 120. due that the straight line where the four piezoresistors are located is perpendicular to the temperature gradient direction, the temperatures of the four piezoresistors are the same, thus offsetting the influence of temperature on the output signals of the bridge.

It should be noted here that in one embodiment, as shown in FIG. 1, the bending beam 120 is in a sheet shape, one side of which is the stressed surface 1201, and the other side is the strain surface 1202. The structure is simple, convenient for production and manufacturing, and which is conducive to reducing the manufacturing cost of the beam pressure sensor 100.

In the specific implementation, the length, width and thickness of the bending beam 120 can be arranged as required.

In the embodiment, the length of bending beam 120 is arranged between 1 mm and 50 mm, the thickness of bending beam 120 is arranged between 0.1 mm and 10 mm, and the width-thickness ratio of bending beam 120 is arranged between 0.1 and 500.

In the embodiment, the Young's modulus of the bending beam 120 is arranged between 0.01 GPa and 1000 GPa, which can be made of stainless steel, aluminum alloy, plastic, glass or PCB, etc.

In one embodiment, as shown in FIG. 1. The beam pressure sensor 100 further includes the strain-side circuit board 130, which is attached to the strain surface 1202, and at least one strain gauge 110 is arranged on the strain-side circuit board 130. Compared with mounting the strain gauges 110 directly onto the strain surface 1202, the strain gauges 110 are firstly mounted onto the strain-side circuit board 130 and then the strain-side circuit board 130 is mounted onto the strain surface 1202 to reduce the difficulty of assembly. The strain gauges 110 can be mounted onto the strain-side circuit board 130 by printing (such as silk screen printing, steel screen printing, ink jetting, slot-die, draw-bar, roll-to-roll, etc.), or by lamination, welding (e.g., SMT, laser welding, ACF, etc.), etc.

In the embodiment, the strain-side circuit board 130 is bonded to the strain surface 1202 by a bonding structural member 150.

In one embodiment, as shown in FIG. 1. The beam pressure sensor 100 further includes a stressed-side circuit board 140, which is attached to the stressed surface 1201, and at least one strain gauge 110 is arranged on the stressed-side circuit board 140. Compared with mounting the strain gauge 110 directly on the stressed surface 1201, the strain gauges 110 are firstly mounted onto the stressed-side circuit board 140 and then the stressed-side circuit board 140 is mounted onto the stressed surface 1201 to reduce the difficulty of assembly. The strain gauges 110 can be mounted onto the stressed-side circuit board 140 by printing (such as silk screen printing, steel screen printing, ink jetting, slot-die, draw-bar, roll-to-roll, etc.), or by lamination, welding (e.g., SMT, laser welding, ACF, etc.), etc.

In the embodiment, the stressed-side circuit board 140 is bonded to the stressed surface 1201 by the bonding structural member 150.

In one embodiment, as shown in FIG. 1. At least one of the strain gauges 110 is arranged on both the stressed surface 1201 and the strain surface 1202. In this way, the detection sensitivity of the beam pressure sensor 100 can be further improved.

In one embodiment, the strain gauge 110 is a piezoresistor or a piezoelectric ceramic. The piezoresistor can be resistance of various materials, and the resistance has the following characteristics, that is, the resistance value changes with the mechanical deformation of the resistance.

Figure 18:
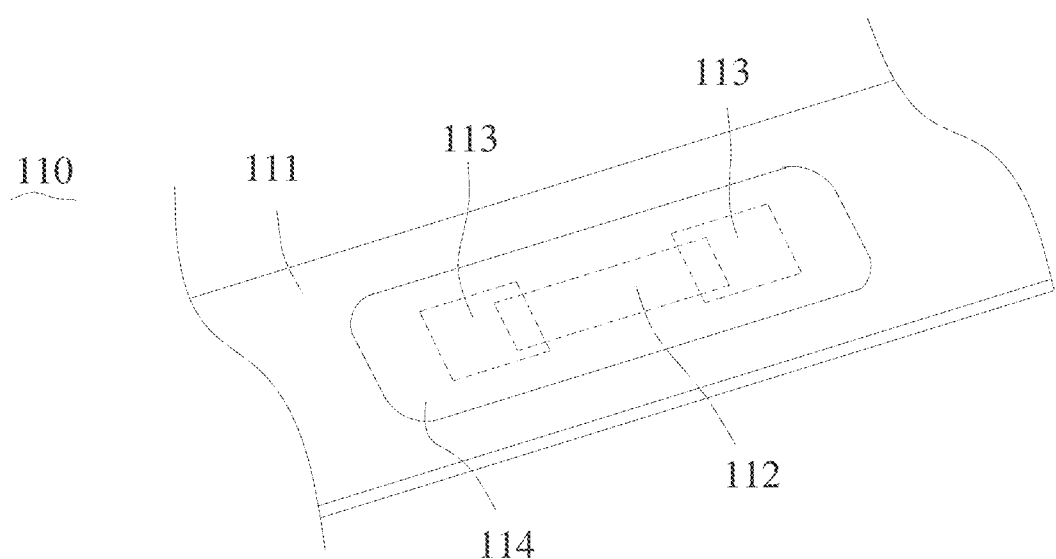
FIG. 18 is a structure diagram of the strain gauge as a piezoresistor in the present application.
Figure 19:
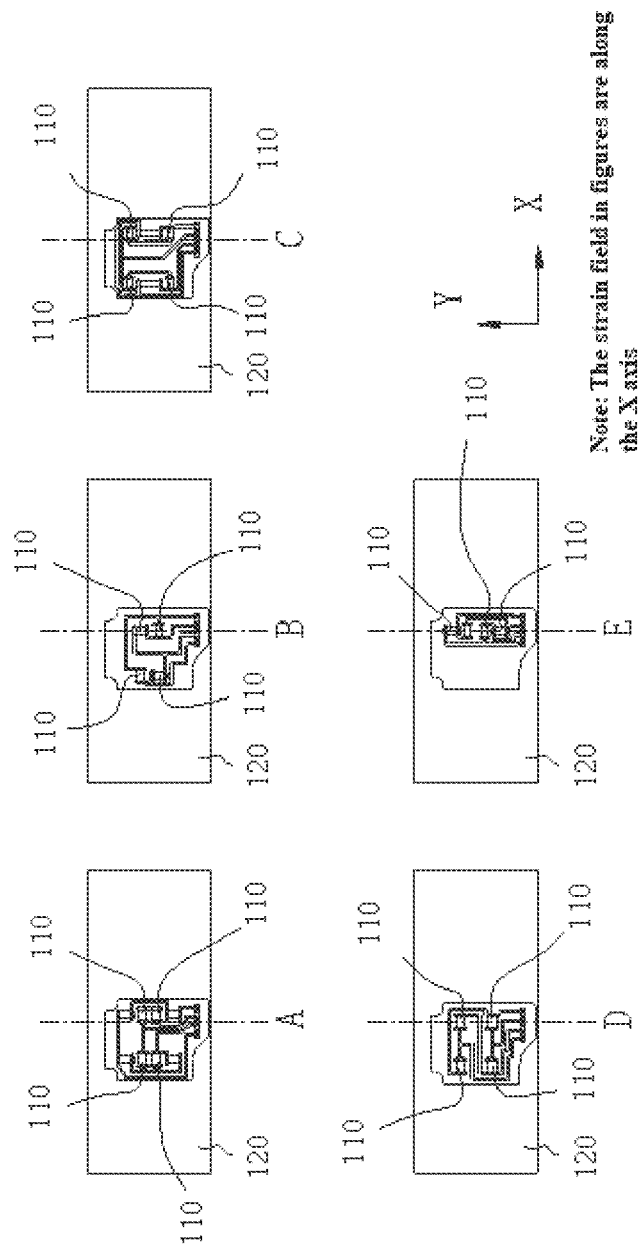
FIG. 19 is a structure diagram of other implementations of a beam pressure sensor of the present application.
Figure 20:
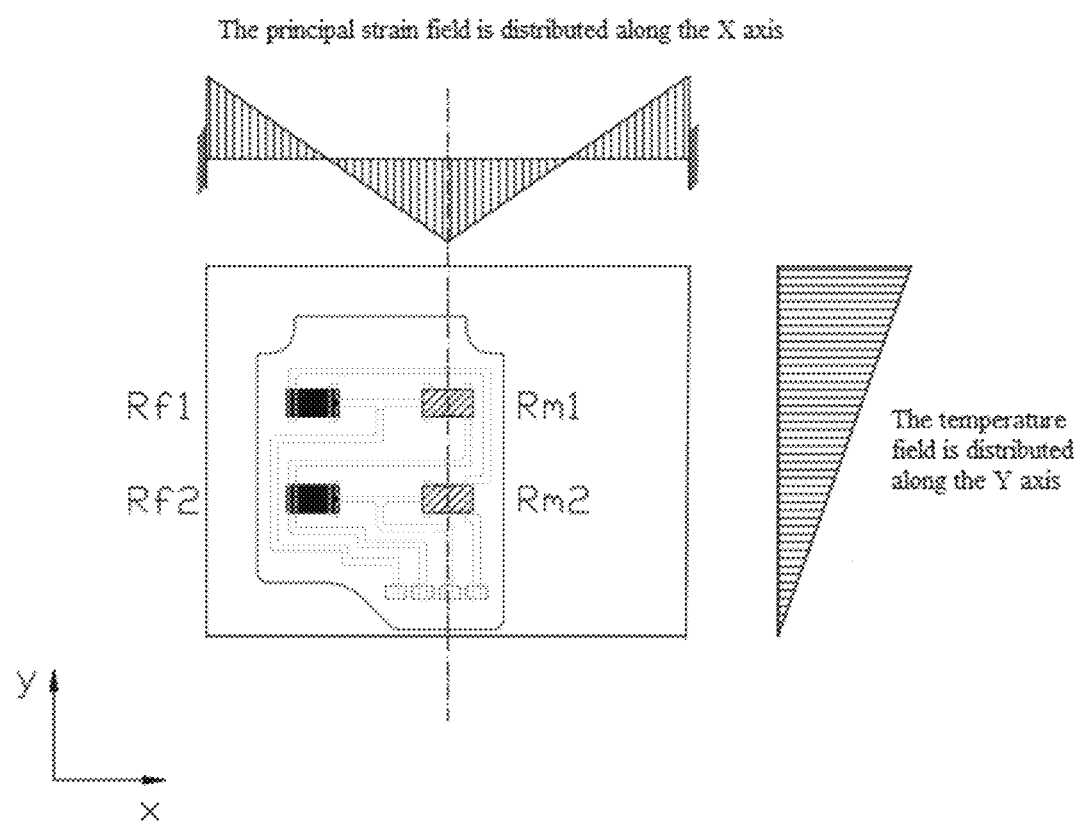
FIG. 20 is a relationship between a principal strain and a temperature field of a bending beam, where a temperature gradient direction and a principal strain gradient direction of the bending beam are vertical.

As shown in FIG. 18, the piezoresistor includes a base material 111, a pressure sensitive adhesive 112, a conductive layer 113 and an insulating layer 114; the resistance of the pressure sensitive adhesive 112 changes with its strain, the conductive layer 113 acts as a conductor, and the insulating layer 114 acts as an electrical isolation and protection. In addition, in order to reduce the interference of the temperature difference of each resistor onto the signal, an aluminum film, a copper film, a graphite film and other high thermal conductivity film materials or coatings can also be pasted on the outside of the insulating layer 114.

In one embodiment, the beam pressure sensor 100 also includes a force-transmitting structure member 160, which is arranged to be opposite to and abuts against the stressed surface 1201. In this way, when a plurality of beam pressure sensors 100 are used at the same time, the force-transmitting structure members 160 are abutted against a same stressed member 200, such that a plurality of beam pressure sensors 100 jointly detect a same force. The force-transmitting structure member 160 can be made of materials with different hardness, or soft, such as silicone, rubber, foam, etc., or hard material, such as plastic, glass, epoxy, etc. The force-transmitting structure member 160 can be placed in the center of the bending beam 120, or not in the center, and can be offset.

Figure 13:
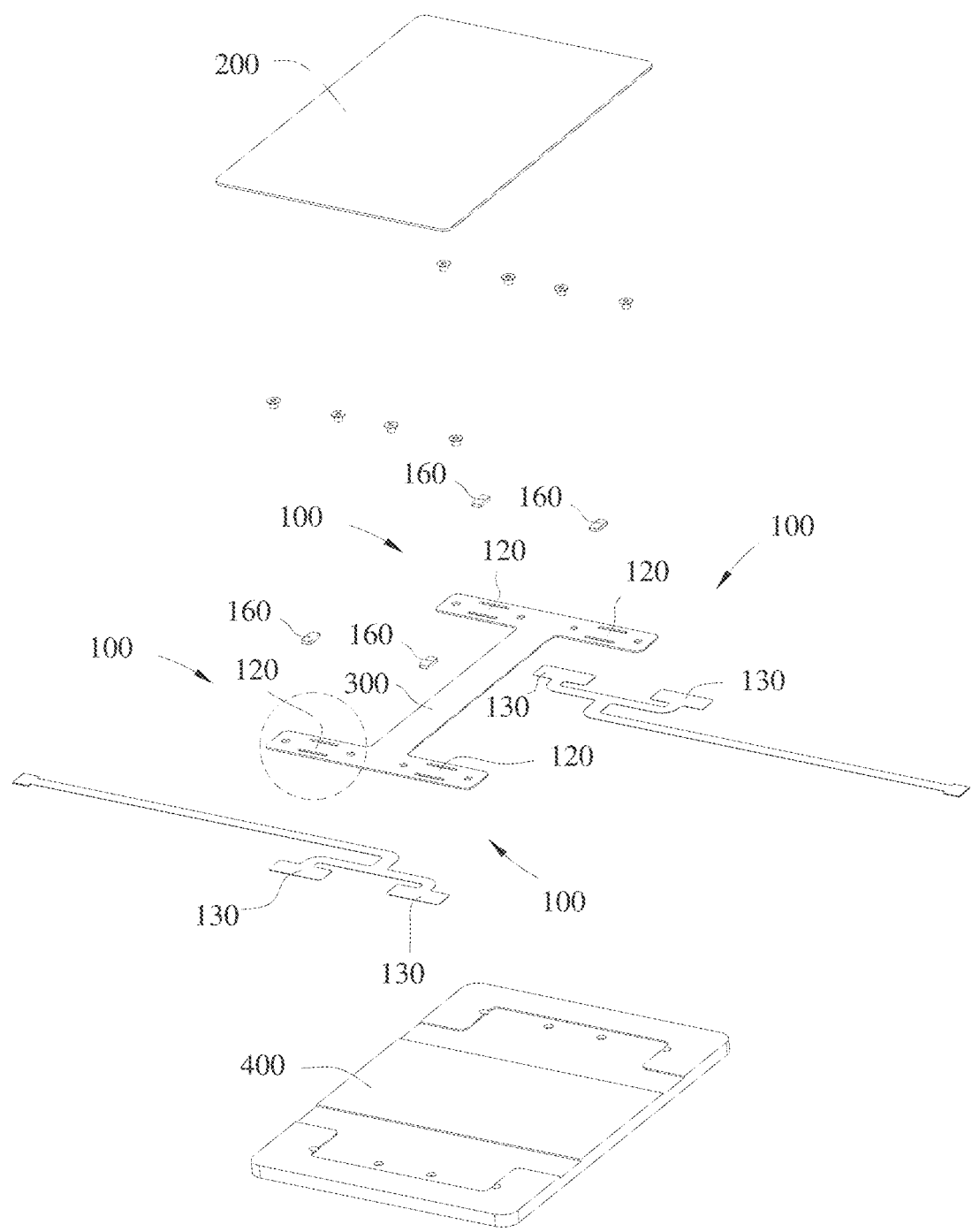
FIG. 13 is an exploded view of a pressure sensing device provided by an embodiment of the present application.
Figure 14:
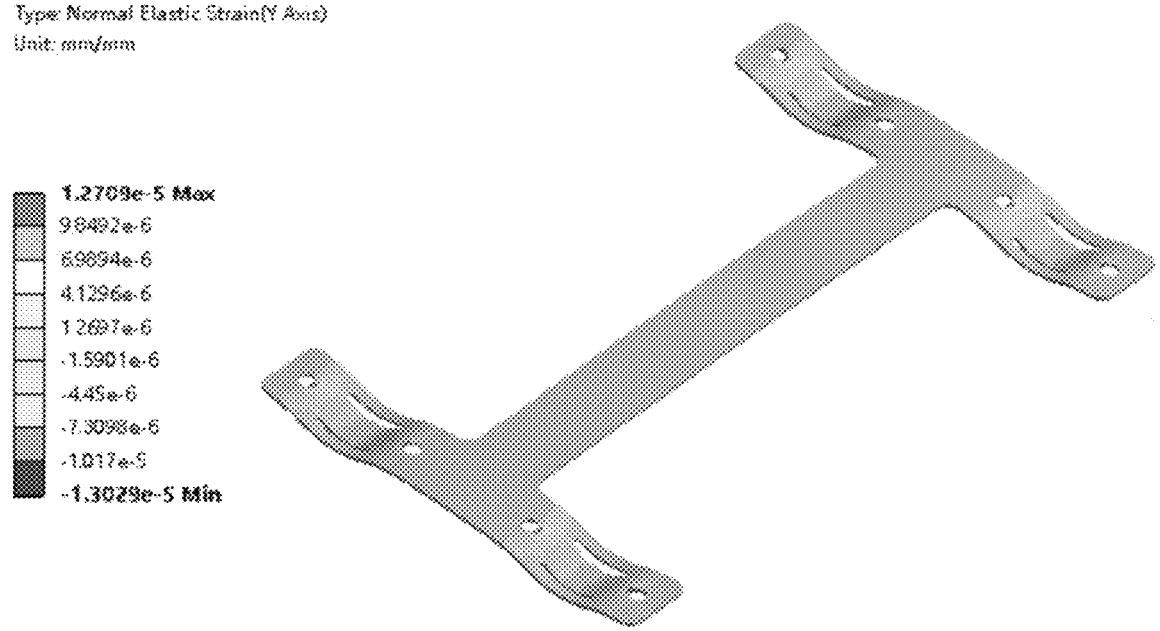
FIG. 14 is a deformation diagram of a pressure sensing device with four strain gauges provided by an embodiment of the present application.
Figure 15:
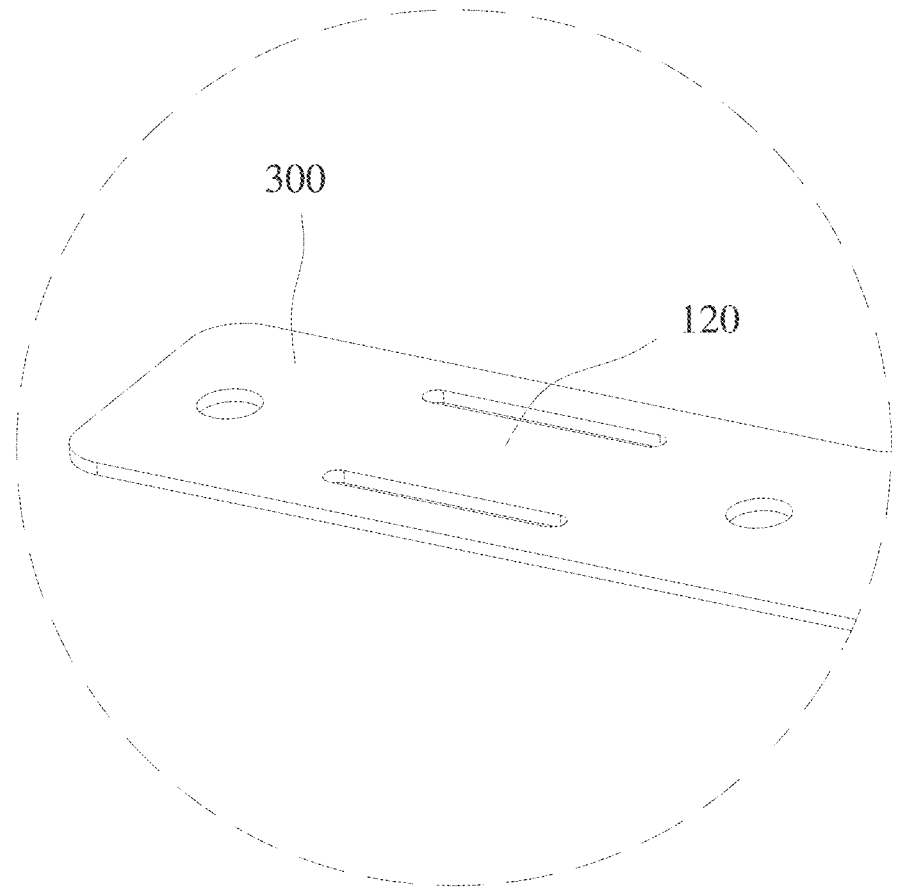
FIG. 15 is an enlarged structure diagram of a part A in FIG. 13.
Figure 16:
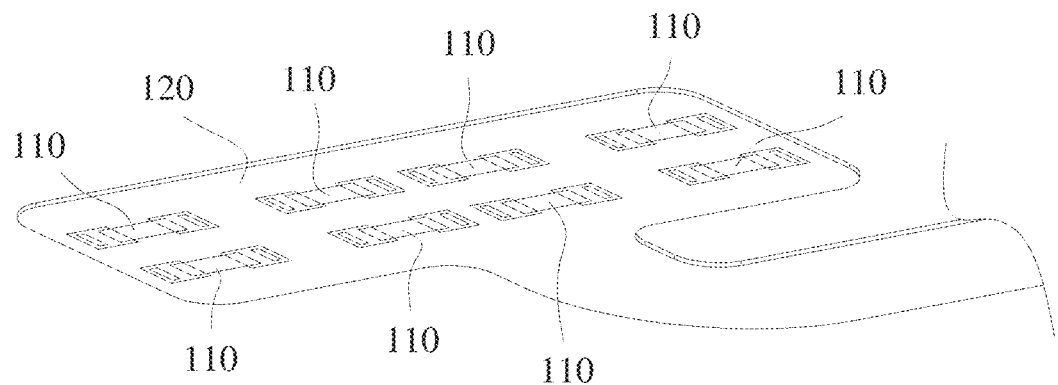
FIG. 16 is a perspective view of a local structure of a pressure sensing device provided by an embodiment of the present application.
Figure 17:
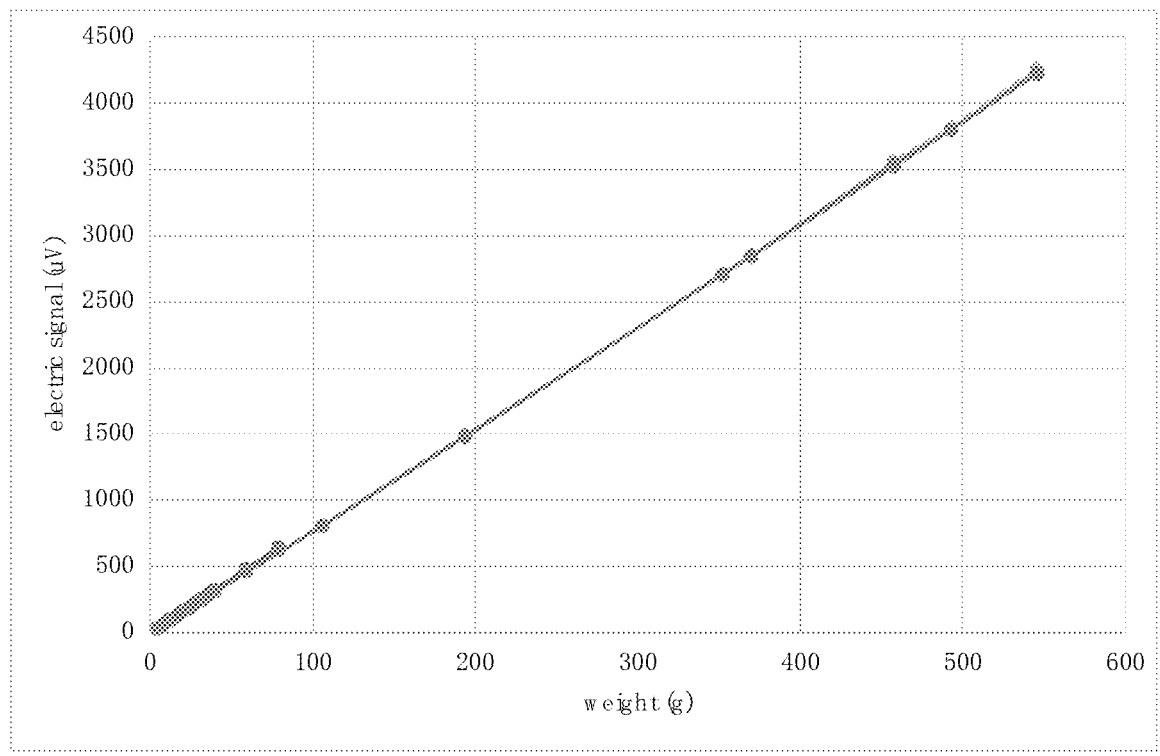
FIG. 17 is a relationship between a sum of electrical signals measured by beam pressure sensors of a pressure sensing device provided by an embodiment of the present application and a weight of an object carried by the pressure sensing device.

As shown in FIGS. 13, 15 and 16, some embodiments of the present application provide a pressure sensing device, which includes:
 a base 400;
 a stressed member 200; and
 at least two beam pressure sensors 100, the beam pressure sensors 100 are mounted on the base 400. Each of the beam pressure sensors 100 includes a bending beam 120, a strain gauge 110 and a force-transmitting structure member 160, a plurality of the strain gauges 110 is provided, the two ends of the bending beam 120 are fixed, and the outside wall surface of the bending beam 120 is provided with a stressed surface 1201 and a strain surface 1202 that are arranged to be opposite to each other, at least one of the stressed surface 1201 and the strain surface 1202 is provided with at least one of the strain gauges 110; and the strain gauges 110 form at least one circuit for detecting strain, and the force-transmitting structural member 160 is arranged to be opposite to and abuts against the stressed surface 1201;
 each force transmission structural member 160 is abutted against the stressed member 200, and each of the beam pressure sensors 100 is located between the base 400 and the stressed member 200.

Figure 5:
FIG. 5 is a sectional view of a bending beam of a beam pressure sensor provided by an embodiment of the present application.

When a pressing force is applied onto the stressed member 200, the stressed member 200 is simultaneously supported by the plurality of beam pressure sensors 100, and a sum of the supporting forces is balanced with the pressing force. Therefore, when a constant pressure is applied at any position within the effective range of the stressed member 200, and a sum of the measured signals of the plurality of beam pressure sensors 100 is a constant value. Therefore, the pressure can be accurately measured without the system providing position information, and within a certain range, the relationship between signal and pressure is linear, as shown in FIG. 5, so it can be used to measure the pressure value.

The bending beams 120 can be independent or connected with each other; The position relationship of each beam pressure sensor 100 can be arranged in a in-line, a triangular, a rectangular or other layout.

As shown in FIG. 22, in the embodiment, the electric bridge composed of strain gauges 110 transmits the electric signals of the strain gauges 110 to the A/D converter through an amplification circuit, the A/D converter converts the electric signals into digital signals, and then inputs the digital signals to a microprocessor. In the microprocessor, different software algorithms are designed to achieve different functions.

In the embodiment, the pressure sensing device further includes a common connector 300, and both ends of each bending beam 120 are fixed to the common connector 300. Specifically, each bending beam 120 and the common connector 300 are in an integrated structure, and the common connector 300 and each bending beam 120 can be formed through a sheet structure through a stamping process, which can reduce the difficulty and cost of production and manufacturing.

In other embodiments, each bending beam 120 can also be connected to the common connector 300 through at least one connecting member, so as to realize the mechanical connection between each bending beam 120 and the common connector 300.

In other embodiments, each bending beam 120 and the common connector 300 can also be non-integrated structures, but they are connected together mechanically.

Some embodiments of the present application provide an electronic apparatus, which includes at least one beam pressure sensor 100, and the beam pressure sensor 100 includes:
- a bending beam 120, two ends of the bending beam 120 are fixed, outside wall surfaces of the bending beam 120 are provided with a stressed surface 1201 and a strain surface 1202 arranged to be opposite to each other; and
- one or more strain gauges 110, each strain gauge 110 being electrically connected to a circuit configured for detecting strain;
- at least one of the stressed surface 1201 and the strain surface 1202 is provided with at least one of the strain gauges 110.

The electronic apparatus include but are not limited to a smart phone, a tablet, a laptop, a computer input device, a touch pad, a track pad, an electronic scale, etc.

The two ends of the bending beam 120 are fixed, and the outside wall surface of the bending beam 120 has two relatively arranged stressed surfaces 1201 and strain surface 1202;

The strain gauge 110 is provided with one or more, and each strain gauge 110 is electrically connected to a circuit for detecting strain;

At least one of the strain gauges 110 is arranged on at least one of the stressed surface 1201 and strain surface 1202.

The above are only embodiments of the present application and are not intended to limit the present application. For those skilled in the art, the present application can have various changes. Any modification, equivalent replacement, improvement, etc. made within the principle of the present application shall be included in the scope of the claims of the present application.

What is claimed is:

1. A beam pressure sensor, comprising:
    a bending beam, provided with two ends that are configured to be fixed to a fixed structure, respectively, wherein outside wall surfaces of the bending beam are provided with a stressed surface and a strain surface arranged to be opposite to each other; and
    a plurality of strain gauges, being electrically connected to a circuit configured for detecting strain, wherein the stressed surface and the strain surface are provided with the plurality of strain gauges;
    a strain-side circuit board attached to the strain surface, the strain-side circuit board mounted with at least one of the plurality of strain gauges; and
    a stressed-side circuit board attached to the stressed surface, the stressed-side circuit board mounted with at least another one of the plurality of strain gauges.

2. The beam pressure sensor according to claim 1, wherein the bending beam is in a sheet shape, one side of which is the stressed surface, and the other side is the strain surface.

3. The beam pressure sensor according to claim 2, wherein a length of the bending beam is ranged from 1 mm to 50 mm, a thickness of the bending beam is ranged from 0.1 mm to 10 mm, and a width-thickness ratio of the bending beam is ranged from 0.1 to 500.

4. The beam pressure sensor according to claim 2, wherein the Young's modulus of the bending beam is ranged from 0.01 GPa to 1000 GPa.

5. The beam pressure sensor according to claim 1, wherein the strain-side circuit board is bonded to the strain surface through a bonding structural member.

6. The beam pressure sensor according to claim 1, wherein the stressed-side circuit board is bonded to the stressed surface through a bonding structural member.

7. The beam pressure sensor according to claim 1, wherein both the stressed surface and the strain surface are respectively provided with at least one of the strain plurality of gauges.

8. The beam pressure sensor according to claim 1, wherein each of the plurality of strain gauges is a piezoresistor or a piezoelectric ceramic.

9. The beam pressure sensor according to claim 1, wherein the beam pressure sensor further comprises a force-transmitting structural member arranged to be opposite to the stressed surface and abutted against the stressed surface.

10. A pressure sensing device, comprising:
    a base;
    a stressed member;
    at least two beam pressure sensors, mounted on the base, wherein each of the at least two beam pressure sensors comprises: a bending beam, a plurality of strain gauges, and a force-transmitting structural member; two ends of the bending beam are configured to be fixed to a fixed structure, respectively, and outside wall surfaces of the bending beam are provided with a stressed surface and a strain surface arranged to be opposite to each other; the stressed surface and the strain surface are provided with the plurality of strain gauges; and the plurality of strain gauges form at least one circuit for detecting strain, and the force-transmitting structural member is arranged to be opposite to and abuts against the stressed surface, wherein each force transmission structural member is abutted against the stressed member, and each of the beam pressure sensors is located between the base and the stressed member;
a strain-side circuit board attached to the strain surface, the strain-side circuit board mounted with at least one of the plurality of strain gauges; and
a stressed-side circuit board attached to the stressed surface, the stressed-side circuit board mounted with at least another one of the plurality of strain gauges.

11. The pressure sensing device according to claim 10, wherein the pressure sensing device further comprises a common connector, and both ends of each bending beam are fixed to the common connector.

12. The pressure sensing device according to claim 11, wherein each bending beam and the common connector are integratedly formed.

13. An electronic apparatus, comprising: at least one beam pressure sensor, wherein the beam pressure sensor comprises:
a bending beam, provided with two ends that are configured to be fixed to a fixed structure, respectively, wherein outside wall surfaces of the bending beam are provided with a stressed surface and a strain surface arranged to be opposite to each other; and
a plurality of strain gauges, being electrically connected to a circuit configured for detecting strain, wherein the stressed surface and the strain surface are provided with the plurality of strain gauges;
a strain-side circuit board attached to the strain surface, the strain-side circuit board mounted with at least one of the plurality of strain gauges; and
a stressed-side circuit board attached to the stressed surface, the stressed-side circuit board mounted with at least another one of the plurality of strain gauges.

* * * * *